US012808347B2

(12) United States Patent
Salter et al.

(10) Patent No.: US 12,808,347 B2
(45) Date of Patent: Nov. 24, 2026

(54) SYSTEMS AND METHODS TO START A VEHICLE ENGINE TO CHARGE A VEHICLE BATTERY

(71) Applicant: Ford Global Technologies, LLC, Dearborn, MI (US)

(72) Inventors: Stuart C. Salter, White Lake, MI (US); Omar Idris Saleh, Dearborn Heights, MI (US); John Budaj, West Bloomfield, MI (US); Doug Whiteman Smith, Farmington Hills, MI (US); David Lloyd Nutt, Monroe, MI (US); Todd Ansbacher, Westland, MI (US); John Robert Van Wiemeersch, Novi, MI (US)

( * ) Notice: Subject to any disclaimer, the term of this patent is extended or adjusted under 35 U.S.C. 154(b) by 59 days.

(21) Appl. No.: 18/980,544

(22) Filed: Dec. 13, 2024

(65) Prior Publication Data

US 2026/0168474 A1 Jun. 18, 2026

(51) Int. Cl.

*F02N 11/08* (2006.01)
*B60Q 9/00* (2006.01)
*B60W 60/00* (2020.01)

(52) U.S. Cl.

CPC ............ *F02N 11/0862* (2013.01); *B60Q 9/00* (2013.01); *B60W 60/00* (2020.02); *F02N 2200/061* (2013.01); *F02N 2200/122* (2013.01)

(58) Field of Classification Search

None

See application file for complete search history.

(56) References Cited

U.S. PATENT DOCUMENTS

| | | | | |
|---|---|---|---|---|
| 7,746,026 | B2 | 6/2010 | Koziara et al. | |
| 8,907,620 | B2 | 12/2014 | Van Wiemeersch | |
| 9,752,370 | B2 | 9/2017 | Van Wiemeersch et al. | |
| 9,784,229 | B2 | 10/2017 | Holub et al. | |
| 10,167,836 | B2 | 1/2019 | Holub et al. | |
| 10,611,258 | B2 | 4/2020 | Symanow et al. | |
| 11,625,960 | B2 | 4/2023 | DeLong et al. | |
| 2004/0217849 | A1 * | 11/2004 | Maehara ............ | B60R 25/1004 340/426.1 |
| 2005/0047162 | A1 * | 3/2005 | Baek ...................... | B60Q 3/267 362/501 |
| 2015/0360578 | A1 | 12/2015 | Duan et al. | |

(Continued)

OTHER PUBLICATIONS

Engvall, Luke, et al., "A predictive trip-based method for state of charge maintenance in series PHEVs to boost cold weather efficiency", Jul. 19, 2012, IEEE (Year: 2012).*

(Continued)

*Primary Examiner* — Navid Z. Mehdizadeh
*Assistant Examiner* — Sarah A. Mueller
(74) *Attorney, Agent, or Firm* — Frank Lollo; Eversheds Sutherland (US) LLP

(57) ABSTRACT

A vehicle including a battery and a processor is disclosed. The processor may determine that a state of charge (SoC) associated with the battery is less than a predefined threshold. The processor may switch ON a vehicle engine for a predefined time duration to charge the battery responsive to determining that the SoC is less than the predefined threshold. The processor may further adjust an operating condition of one or more vehicle components responsive to switching ON the vehicle engine.

19 Claims, 4 Drawing Sheets

(56) References Cited

U.S. PATENT DOCUMENTS

| | | | | |
|---|---|---|---|---|
| 2017/0129359 | A1 | 5/2017 | Dunlap et al. | |
| 2017/0274890 | A1* | 9/2017 | Mansur | B60L 58/13 |
| 2020/0271081 | A1* | 8/2020 | Mulshine | B60R 25/1012 |
| 2021/0403010 | A1* | 12/2021 | Symanow | B60W 50/0225 |
| 2022/0305941 | A1* | 9/2022 | Telpaz | B60L 53/60 |
| 2022/0306076 | A1* | 9/2022 | Diamond | B60W 20/20 |
| 2024/0070258 | A1* | 2/2024 | Cosentino | B60W 50/12 |
| 2024/0198851 | A1 | 6/2024 | Larsen et al. | |
| 2024/0204712 | A1 | 6/2024 | Penne et al. | |
| 2024/0304047 | A1* | 9/2024 | Chiba | G07C 5/0808 |

OTHER PUBLICATIONS

Element14, EV Charging and Battery Management—Ensuring Optimal Performance and Lifespan, https://in.element14.com/ev-charging-and-battery-management-trc-ar, 2024, pp. 1-5.

* cited by examiner

SYSTEMS AND METHODS TO START A VEHICLE ENGINE TO CHARGE A VEHICLE BATTERY

FIELD

The present disclosure relates to systems and methods to auto-start or remote-start a vehicle engine to charge a vehicle battery.

BACKGROUND

It is known that a vehicle battery drains if the vehicle is parked in an unused state for a long time duration. Such instances may occur in vehicle auction lots, marshalling yards, airport parking lots, and other similar places where vehicles are generally stationed in unused state for long time durations.

Battery drain typically occurs due to vehicle's key-off load. If a state of charge (SoC) of a vehicle battery drops below a certain threshold, it may become difficult to start or crank the vehicle engine or it may not be possible to start the vehicle. Such instances may cause inconvenience to the vehicle operator.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
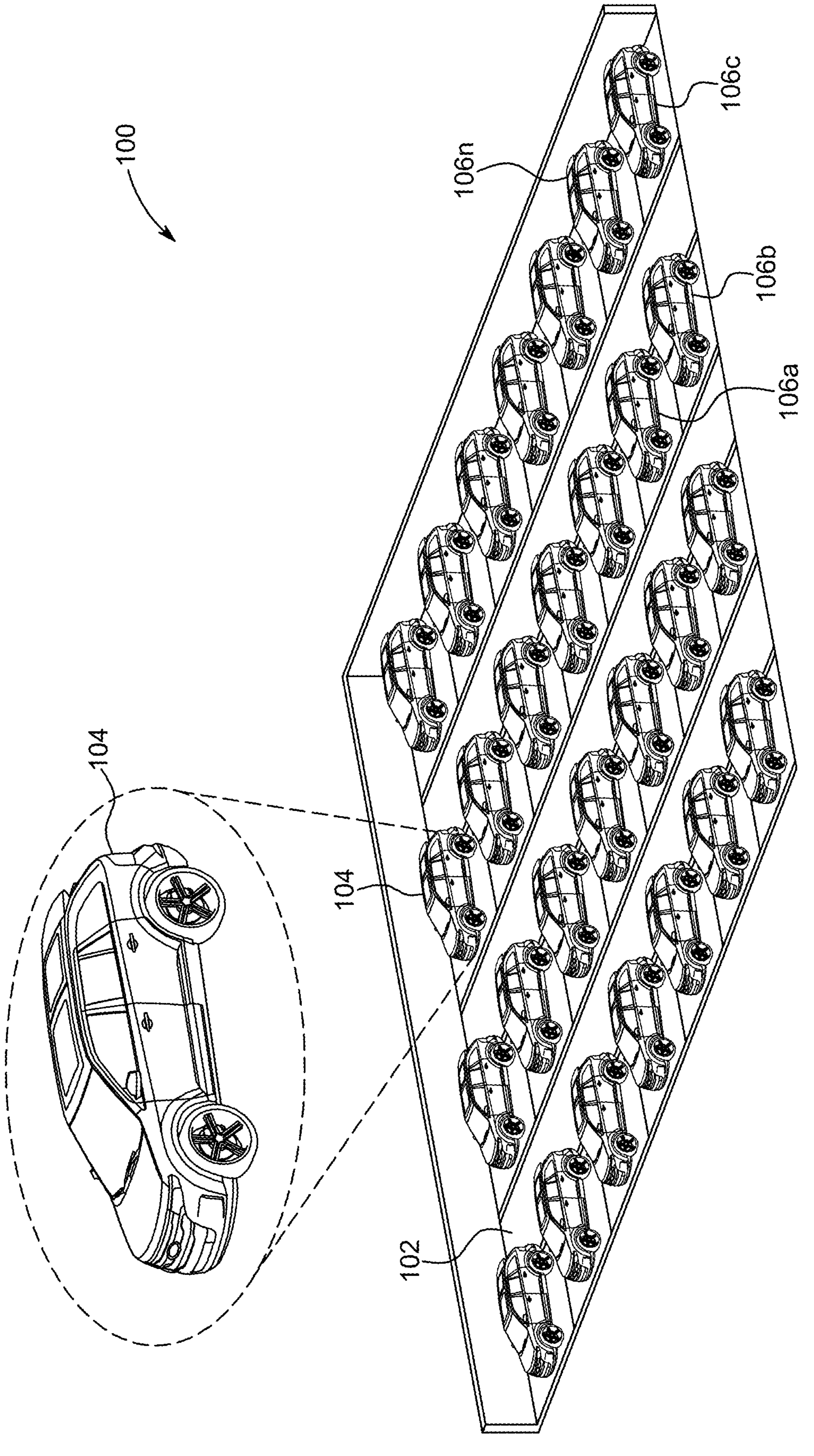
FIG. 1 depicts an environment in which techniques and structures for providing the systems and methods disclosed herein may be implemented.

The present disclosure describes a vehicle that may auto-start or remote-start the vehicle engine to charge the vehicle battery, when a state of charge (SoC) level associated with the battery drops below a predefined threshold. The vehicle may switch ON the engine to charge the battery when the vehicle may be located at a predefined location, e.g., at a vehicle auction lot, a marshalling yard, an airport parking lot, or any other similar place where vehicles are generally parked in an unused state for long time durations. By auto-starting or remote-starting the engine to charge the battery, the vehicle may compensate for the battery drain that may occur when the vehicle is parked in an unused state for a long time duration, thereby ensuring that the battery has enough SoC to crank the engine when a vehicle operator desires to start the vehicle.

In some aspects, the vehicle may switch ON the engine to charge the battery for a predefined time duration (e.g., 30 minutes), after which the vehicle may switch OFF the engine to reduce emissions. The vehicle may again switch ON the engine to charge the battery after a predefined time interval (e.g., after 12 hours, 24 hours, 3 days, etc.). The vehicle may perform the steps of switching ON and switching OFF the engine to charge the battery iteratively, till the SoC reaches to a predefined optimal SoC level. The predefined optimal SoC level may be defined by the vehicle operator or a fleet manager, and/or may be based on an ambient temperature, a battery temperature, a battery health condition, and/or the like. In some aspects, the predefined optimal SoC level may be an SoC level at which the battery may efficiently crank the vehicle engine. In other aspects, the predefined optimal SoC level may be greater than 90% or close to 100%.

The vehicle may provide additional features to the operator/fleet manager or perform additional actions to efficiently charge the battery. For example, the vehicle may automatically switch OFF the vehicle lights when the engine may be running, to further save energy for battery charging and/or prevent attracting passersby (or malicious users) to the vehicle. The vehicle may additionally not switch ON the engine during night time to prevent attracting passersby to the vehicle. The vehicle may further not switch ON the engine when the vehicle may be located in a predefined structure (which may be a temporary structure, e.g., under a tent, a shade, etc., or a permanent structure such as a garage) to prevent occurrence of any adverse incident due to emissions.

In further aspects, the vehicle may adjust the tilt points/thresholds associated with the vehicle's tilt and motion sensor(s) to prevent any false trigger from these sensors when the engine may be switched ON.

In additional aspects, the vehicle may determine an optimal time to switch ON the engine to charge the battery, and may switch ON the engine at the determined optimal time. In some aspects, the optimal time may be based on the ambient temperature, battery health condition or the battery temperature. For example, the optimal time may be that time when the ambient/battery temperature may be high, so that the battery may accept maximum amount of charge when the engine may be charging the battery. Stated another way, the optimal time may be that time when the battery is expected to accept charge at a high rate (e.g., greater than a predefined threshold), so that the engine running time to charge the battery may be reduced, thereby saving fuel, emissions and cost. In other aspects, the optimal time may be a user-preferred time to switch ON the engine to charge the battery.

The vehicle may additionally coordinate with other vehicles located at the predefined location (e.g., the vehicle auction lot or a parking lot) such that the engines of the vehicles are switched ON in a staggered manner and at different engine speeds, to reduce noise.

In further aspects, the vehicle may autonomously move to a predefined fuel filling station/pump when a fuel level in the vehicle may be below a predefined fuel threshold, to enable the vehicle to get refueled. It may be appreciated that the engine may run without interruption, and hence efficiently charge the battery, when the fuel level in the vehicle may be high (or greater than the threshold). In additional aspects, responsive to determining that the fuel level in the vehicle may be below the predefined fuel threshold, the vehicle may transmit an alert notification to a user device or a server, thereby notifying an operator or a fleet manager that the vehicle may be running out of fuel.

The present disclosure discloses a vehicle that may auto-start or remote-start the engine to charge the battery when the SoC may be low. In this manner, the vehicle may efficiently compensate for the battery drain, and may ensure that the battery may always have enough SoC to successfully crank the engine whenever the operator desires to start the vehicle. The vehicle further automatically switches OFF the engine after the predefined time duration, to reduce emissions. Furthermore, the vehicle coordinates with other vehicles to ensure that the vehicle engines are switched ON in a staggered manner and at different engine speeds, to reduce noise.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a geographical area 102 in which a plurality of vehicles 104, 106*a*, 106*b*, 106*c*, 106*n* (collectively referred to as vehicles 106) may be parked. The geographical area 102 may be a vehicle auction lot, a vehicle marshalling yard (e.g., a yard associated with an ecommerce firm), an airport parking lot or any other public or private parking lot, or any other similar place where a plurality of vehicles are generally stationed in an unused state for long time durations.

Each vehicle 104, 106 may take the form of any passenger or commercial vehicle such as a car, a work vehicle, a crossover vehicle, a truck, a van, a minivan, a taxi, a bus, a motorcycle, etc. Each vehicle 104, 106 may be a manually driven vehicle or may be configured to operate in a partially/fully autonomous mode. Further, each vehicle 104, 106 may include any powertrain, such as a gasoline engine or a hybrid system.

The present disclosure is described in the context of the vehicle 104; however, the details, features, functions, etc. described in relation to the vehicle 104 are applicable to each vehicle 106 as well. Consequently, the term "vehicle 104" can be replaced by the term "vehicle 106" in the present disclosure, without departing from the present disclosure scope.

In some aspects, the vehicle 104 may include one or more batteries (shown as a battery 240 in FIG. 2) that may power various vehicle components. For example, the battery may power vehicle lights, human-machine interface (HMI), power windows, fans, one or more vehicle sensors, and/or the like. As another example, the power obtained from the battery may be used to start or crank the vehicle engine (shown as engine 242 in FIG. 2). The battery may be a lead-acid battery, a lithium-ion battery, an absorbent glass mat (AGM) battery, or any other similar type of battery.

It is known that the battery may drain if the vehicle 104 is parked in an unused state (i.e., a state where the vehicle engine is not switched ON) for a long time duration in the geographical area 102. If a state of charge (SoC) associated with the battery drops below a certain critical threshold, the battery may not have enough power/energy to start or crank the vehicle engine.

In accordance with the present disclosure, the vehicle 104 may auto-start or remote-start the vehicle engine to charge the battery when the SoC drops below a predefined threshold (e.g., 50%), to ensure that the battery may always have enough SoC to efficiently start or crank the vehicle engine (whenever a vehicle operator desires to start the vehicle engine and to ensure the auto-start can be used multiple times over an extremely long term parking situation, e.g., 3-4 months). The vehicle 104 may not move when the vehicle 104 auto-starts or remote-starts the vehicle engine to charge the battery. The vehicle 104 may auto-start or remote-start the vehicle engine only to charge the battery.

In some aspects, the vehicle 104 may auto-start/remote-start or switch ON the vehicle engine for a predefined time duration (e.g., 30 minutes) to charge the battery responsive to determining that the SoC is less than the predefined threshold. The vehicle operator or a fleet manager may pre-set or pre-configure the predefined time duration for which the vehicle 104 may switch ON the vehicle engine based on a plurality of parameters including, but not limited to, an ambient temperature, a battery temperature, a current SoC level, a desired SoC level (described as "predefined optimal SoC level" in the description below), a location where the vehicle 104 is parked (if the vehicle 104 is located in a remote geo-fenced lot, the predefined time duration may be greater than 30 minutes), and/or the like. The vehicle operator or a fleet manager may pre-set the predefined time duration such that the emissions caused due to switching ON of the vehicle engine is optimized, and at the same time the battery is efficiently charged.

The vehicle 104 may switch OFF the vehicle engine when the predefined time duration lapses to reduce the emissions. The vehicle 104 may again switch ON the vehicle engine for the predefined time duration to charge the battery after a predefined time interval (e.g., after 12 hours, 18 hours, 1 day, 3 days, and/or the like). The vehicle 104 may again switch OFF the vehicle engine when the predefined time duration lapses. The vehicle 104 may perform these steps of switching ON and switching OFF the vehicle engine, as described above, iteratively till the SoC reaches to a predefined optimal SoC level (which may be 75% or above).

The predefined optimal SoC level may be an SoC level at which the battery may conveniently start or crank the vehicle engine. In some aspects, the predefined optimal SoC level may be based on the ambient temperature, the battery temperature, a battery health condition, and/or the like. As an example, if the ambient temperature is low (e.g., less than a predefined temperature threshold), the vehicle operator, the fleet manager or the vehicle 104 itself may set the predefined optimal SoC level high (e.g., 90%), as the battery may require more power/energy to crank the vehicle engine in cold temperature. As another example, if the battery health condition indicates that the battery is old or loses capacity relatively quickly, the vehicle operator, the fleet manager or the vehicle 104 itself may set the predefined optimal SoC level high (e.g., 90%), to ensure that the battery has enough SoC to crank the vehicle engine when the operator desires to start the vehicle 104. In further aspects, the predefined optimal SoC level may be user-defined.

In some aspects, the vehicle 104 may perform the steps of iteratively switching ON and switching OFF the vehicle engine to charge the battery, as described above, when the vehicle 104 may be located at a predefined location (e.g., the geographical area 102), which may be set/defined by the vehicle operator or the fleet manager. For example, the vehicle operator may set or configure that the vehicle 104 may iteratively switch ON and switch OFF the vehicle engine to charge the battery when the vehicle 104 may be located at the operator's home, but may not switch ON the vehicle engine to charge the battery when the vehicle 104 may be located at the operator's office. As another example, the fleet operator may set or configure that the vehicle 104 may iteratively switch ON and switch OFF the vehicle engine to charge the battery when the vehicle 104 may be located at a vehicle auction lot, a vehicle marshalling yard, an airport parking lot, and/or the like (e.g., the geographical area 102).

In this case, responsive to determining that the vehicle 104 is located at the predefined location, the vehicle 104 may activate a "vehicle battery management mode" or a "lot management mode". The vehicle 104 may then iteratively switch ON and switch OFF the vehicle engine to charge the battery as described below, when the vehicle battery management mode may be activated.

In further aspects, the vehicle 104 may automatically deactivate the vehicle battery management mode when the vehicle 104 may be located in a temporary structure (e.g., a tent, a shade, etc.) within the predefined location, thereby preventing the vehicle 104 from switching ON the vehicle engine to charge the battery. It may be appreciated that by preventing the vehicle 104 from switching ON the vehicle engine in the temporary structure, the vehicle 104 may prevent occurrence of any adverse incident (which may occur due to the auto-start/remote-start of the vehicle engine in the temporary structure or due to emissions).

The vehicle 104 may provide additional features to the operator/fleet manager or perform additional actions to efficiently charge the battery. For example, the vehicle 104 may determine an optimal time or moment to switch ON the vehicle engine to charge the battery based on the ambient temperature, battery health condition and/or the battery temperature, and switch ON the vehicle engine at the determined optimal time. In some aspects, the vehicle 104 may switch ON the vehicle engine to charge the battery when the weather conditions and/or the battery temperature may be optimal for the battery to accept maximum amount of charge (e.g., when the ambient temperature and/or the battery temperature may be warm or higher than a predefined battery temperature threshold). Stated another way, the optimal time may be that time when the battery is expected to accept charge at a high rate (e.g., greater than a predefined threshold), so that the engine running time to charge the battery may be reduced, thereby saving fuel, emissions and cost.

In further aspects, the vehicle 104 may switch ON the vehicle engine to charge the battery at a user-preferred time (which may be set/configured by the vehicle operator or the fleet manager). The vehicle 104 may additionally transmit a confirmation request to a user device (shown as user device 204 in FIG. 2) associated with the vehicle operator, to confirm whether the operator is fine with the vehicle 104 switching ON the vehicle engine to charge the battery. The vehicle 104 may switch ON the vehicle engine when the vehicle 104 receives a confirmation from the operator via the user device.

In additional aspects, the vehicle 104 may adjust an operating condition of one or more vehicle components responsive to switching ON the vehicle engine or when the vehicle engine may be running, to prevent attracting passersby to the vehicle 104 and/or to prevent any of the vehicle sensors from false reading or false trigger. For example, the vehicle 104 may switch OFF vehicle lights when the vehicle engine may be switched ON, to prevent the vehicle 104 from attracting passersby (or malicious users) to the vehicle 104. As another example, the vehicle 104 may adjust a tilt and motion threshold or trip points/thresholds associated with vehicle's tilt and motion sensor(s) when the vehicle engine may be switched ON, to prevent false triggering of these sensors. The vehicle's tilt and motion sensor may detect vehicle's motion and may cause the vehicle 104 to output an alarm when the motion is detected. By adjusting the trip points/thresholds associated with the vehicle's tilt and motion sensor(s), the vehicle 104 may ensure that the sensor does not raise any false trigger (e.g., due to a slight vehicle motion that may happen when the vehicle 104 switches ON the vehicle engine).

The vehicle 104 may further not switch ON the vehicle engine during user-defined restrictive times, e.g., to prevent attracting passersby to the vehicle 104. For example, the vehicle 104 may not switch ON the vehicle engine during nighttime to prevent attracting malicious users to the vehicle 104.

Furthermore, the vehicle 104 may switch ON the vehicle engine such that the vehicle engines of the vehicle 104 and the vehicles 106 run (or are switched ON) in a staggered manner and with different engine speeds, to reduce noise. In this case, the vehicle 104 may obtain information associated with respective vehicle engine start times and vehicle engine speeds (specifically, revolutions per minute (rpm)) from the vehicles 106, and may accordingly switch ON its own vehicle engine such that the engines of the vehicles 104, 106 run in a staggered manner and with different engine speeds.

Further vehicle 104 details are described below in conjunction with FIG. 2.

The vehicles 104, 106 implement and/or perform operations, as described here in the present disclosure, in accordance with the owner manual and safety guidelines. In addition, any action taken by the vehicle operator/fleet manager based on the notifications provided by the vehicles 104, 106 should comply with all the rules specific to the location and operation of the vehicles 104, 106 (e.g., Federal, state, country, city, etc.). The notifications, as provided by the vehicles 104, 106 should be treated as suggestions and only followed according to any rules specific to the location and operation of the vehicles 104, 106.

Figure 2:
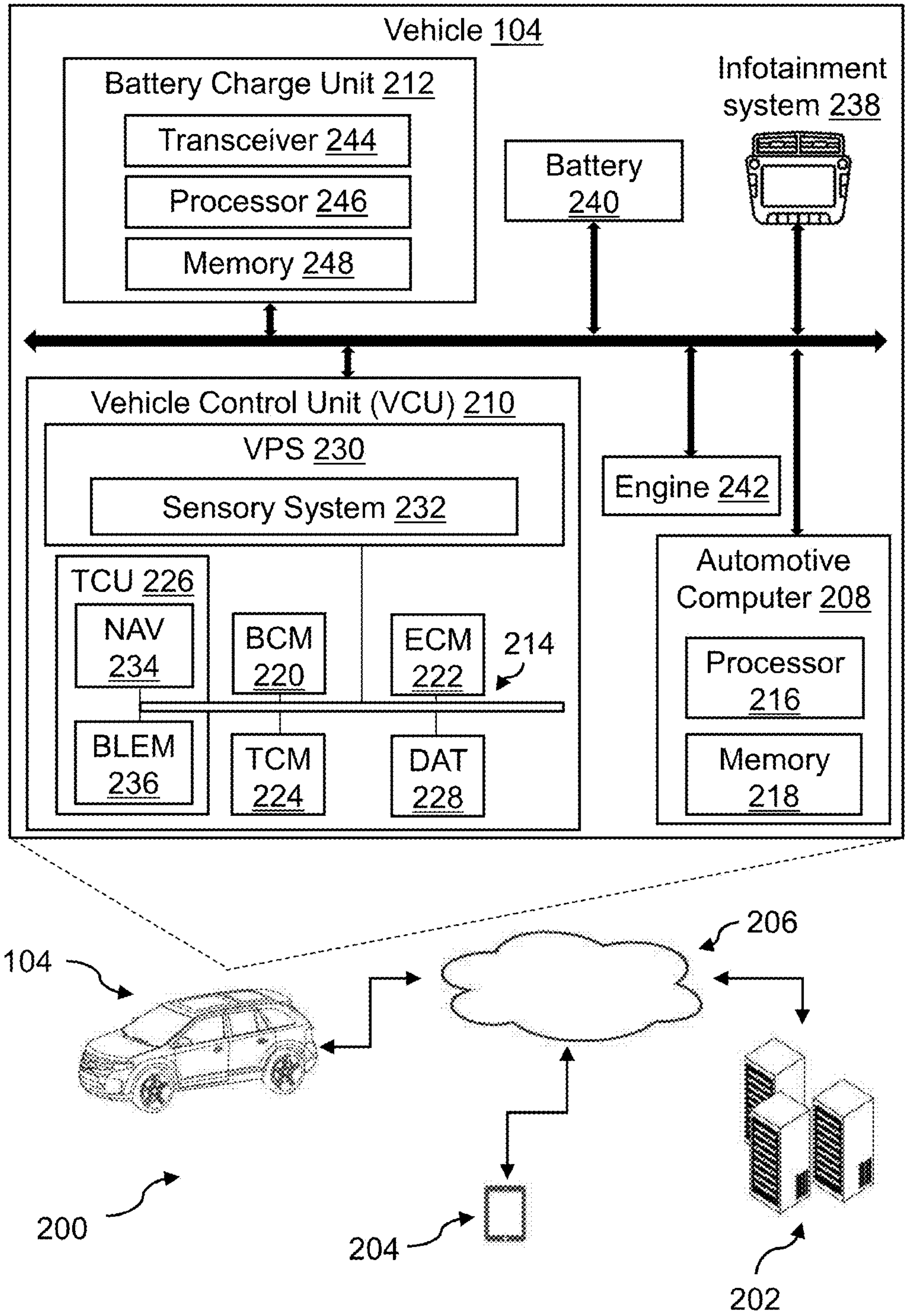
FIG. 2 depicts a block diagram of a system to auto-start or remote-start a vehicle engine in accordance with the present disclosure.

FIG. 2 depicts a block diagram of a system 200 to auto-start or remote-start a vehicle engine in accordance with the present disclosure. While describing FIG. 2, references will be made to FIG. 3.

The system 200 may include the vehicle 104 (and the vehicles 106, not shown in FIG. 2), one or more servers 202 (or a server 202) and a user device 204 that may be communicatively coupled with each other via one or more networks 206. The user device 204 may be associated with the vehicle operator or the fleet manager, and may include, for example, a mobile phone, a computer, a laptop, a tablet, a smartwatch, a smart fob, or any other device with communication capabilities. The server 202 may be part of a cloud-based computing infrastructure and may be associated with and/or include a Telematics Service Delivery Network (SDN) that provides digital data services to the vehicle 104 and other vehicles (e.g., the vehicles 106) that may be part of a vehicle fleet.

In further aspects, the server 202 may store information associated with user preference(s) for switching ON the vehicle engine to charge the battery, which may be provided by the vehicle operator/fleet manager to the server 202 via the user device 204. In an exemplary aspect, the information associated with user preference may include information of the predefined location(s) where the vehicle 104 may switch ON the vehicle engine to charge the battery, the predefined threshold (e.g., 50%) of the battery SoC at which the vehicle 104 may switch ON the vehicle engine to charge the battery, the user-preferred time(s) to switch ON the vehicle engine to charge the battery, the user-preferred SoC level up to which the vehicle 104 may charge the battery by iteratively switching ON and OFF the vehicle engine, the predefined time duration for which the vehicle 104 may keep the vehicle engine running or in the ON state to charge the battery, the predefined time interval after switching OFF the vehicle engine at which the vehicle 104 may switch ON the vehicle engine again to charge the battery, user-preference on whether the vehicle 104 is required to request for a confirmation before switching ON the vehicle engine to charge the battery, whether the vehicle 104 should be locked before switching ON the vehicle engine to charge the battery, and/or the like. The server 202 may transmit the information associated with user preference to the vehicle 104 when the vehicle 104 transmits a request to the server 202 to receive such information, or the server 202 may transmit such information to the vehicle 104 at a predefined frequency.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth® Low Energy (BLE), Wi-Fi based on the Institute of Electrical and Electronics Engineers (IEEE) standard 802.11, Ultra-Wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 104 may include a plurality of units including, but not limited to, an automotive computer 208, a Vehicle Control Unit (VCU) 210 and a battery charge unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 104, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separated from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a battery charge management program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 104 systems, connected servers (e.g., the server(s) 202), and other vehicles (e.g., the vehicles 106) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc.

The VCU 210 may further include and/or communicate with a Vehicle Perception System (VPS) 230, having connectivity with and/or control of one or more vehicle sensory system(s) 232 (or a "sensor unit"). The vehicle sensory system 232 may include one or more vehicle sensors including, but not limited to, a radio detection and ranging (radar) sensor configured for detection and localization of objects inside and outside the vehicle 104 using radio waves, sitting area buckle sensors, sitting area sensors, a light detecting and ranging (lidar) sensor, door sensors, proximity sensors, temperature sensors, tilt and motion sensors, wheel sensors, ambient weather sensors, ambient light sensors, vehicle internal and external cameras, one or more rain sensors, a humidity sensor, a tire pressure sensor, ultrasonic sensors, etc. In some aspects, the vehicle sensory system 232 may capture inputs (e.g., images) associated with vehicle surroundings. For example, the vehicle exterior cameras may capture images of area/space around the vehicle 104.

In some aspects, the VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 104 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 104 and other systems (e.g., the user device 204, a key fob, an NFC device, etc.), computers, and modules. The NAV receiver 234 may determine a real-time vehicle geolocation. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), fan, headlights, audio system(s), speakers, wipers, door locks and access control, mirrors, various comfort controls, enclosures, and/or the like. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI) 238). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may further receive user instructions/inputs via the touchscreen interface portion and/or display notifications/recommendations, navigation maps, etc. on the touchscreen interface portion. In some aspects, the infotainment system 238/vehicle 104 may additionally receive user information or commands from the HMI of the user device(s) 204.

The vehicle 104 may further include a battery 240 and an engine 242. As described above in conjunction with FIG. 1, the vehicle 104 may switch ON the engine 242 to charge the battery 240, when the vehicle 104 may be parked at the geographical area 102.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 104, may include a transceiver 244, a processor 246, and a computer-readable memory 248.

The transceiver 244 may receive information/inputs from one or more external devices or systems, e.g., the user device 204, the server(s) 202, and/or the like via the network 206. For example, the transceiver 244 may receive the information associated with user preferences (as described above) from the server 202 and/or the user device 204 via the network 206. Further, the transceiver 244 may transmit notifications to the external devices or systems. In addition, the transceiver 244 may receive information/inputs from vehicle 104 components such as the infotainment system 238, the VCU 210, the battery 240 (e.g., receive a real-time battery SoC level from the battery 240) and/or the like. Further, the transceiver 244 may transmit notifications/command signals to the vehicle 104 components such as the VCU 210, the infotainment system 238, the BCM 220, the engine 242, etc.

The processor 246 and the memory 248 may be the same as or similar to the processor 216 and the memory 218, respectively. In some aspects, the processor 246 may utilize the memory 248 to store programs in code and/or to store data for performing aspects in accordance with the disclosure. The memory 248 may be a non-transitory computer-readable medium or memory storing the battery charge management program code. In some aspects, the memory 248 may store the information associated with user preferences described above.

In operation, the processor 246 may fetch the information associated with user preferences from the memory 248 and the inputs from the VCU 210. The processor 246 may further correlate a real-time vehicle geolocation (as determined via the TCU 226) with the predefined location for switching ON the engine 242 to charge the battery 240 (as determined from the information associated with user preferences). Responsive to the correlation, the processor 246 may determine that the vehicle 104 may be parked/located at the predefined location, e.g., the geographical area 102.

The processor 246 may activate a vehicle battery management mode or a lot management mode when the processor 246 determines that the vehicle 104 is located at the predefined location. Responsive to activating the vehicle battery management mode, the processor 246 may monitor the battery 240 SoC level based on the inputs obtained from the battery 240/VCU 210. The processor 246 may switch ON the engine 242 for the predefined time duration to charge the battery 240 when the SoC drops below the predefined threshold (which may be user-defined, e.g., 50%), as described above in conjunction with FIG. 1. As described above, the vehicle operator or the fleet manager may set or configure the predefined time duration (as part of the user preferences) for which the processor 246 may switch ON the engine 242 to charge the battery 240. In some aspects, the predefined time duration may be 30 minutes. In other aspects, the processor 246 may itself set the predefined time duration based on the battery temperature, the SoC, the ambient temperature, a vehicle geolocation, and/or the like. For example, the processor 246 may reduce the predefined time duration (e.g., make it less than 30 minutes) if the battery 240 may be warm or the SoC may not be too low, to reduce emissions due to engine operation. As another example, the processor 246 may increase the predefined time duration (e.g., increase to more than 30 minutes) if the vehicle 104 is located outside in a geofenced lot.

In further aspects, responsive to determining that the SoC is less than the predefined threshold, the processor 246 may determine an optimal time or moment to switch ON the engine 242, and may switch ON the engine 242 at the determined optimal time. In some aspects, the optimal time may be a user-preferred time that the vehicle operator or the fleet manager may provide (as user inputs) to the processor 246 via the user device 204. For example, if the operator desires to use the vehicle 104 at 7 AM, the operator may set the user-preferred time as 5 AM or 6 AM. The operator may additionally set whether the engine 242 should be switched ON once or more than once to charge the battery 240. In this case, the processor 246 may switch ON the engine 242 at 5 AM or 6 AM to charge the battery 240, once or multiple times based on the user preferences/inputs.

In other aspects, the processor 246 may determine the optimal time/moment to switch ON the engine 242 based on the ambient temperature and/or the battery temperature (determined based on the inputs obtained from the VCU 210). As an example, the processor 246 may determine the optimal time/moment to switch ON the engine 242 when the battery 240 is expected to accept maximum amount of charge (e.g., when the ambient temperature and/or the battery temperature may be warm or higher than the predefined battery temperature threshold). In this case, the processor 246 may switch ON the engine 242 to charge the battery 240 when the ambient temperature and/or the battery temperature may be warm to optimize the process of battery charging. In some aspects, the processor 246 may additionally condition (e.g., heat or cool) the battery 240 during the charging process to further enhance/optimize the charging efficiency.

As described above in conjunction with FIG. 1, the processor 246 may further adjust an operating condition of one or more vehicle components responsive to switching ON the engine 242 or when the engine 242 may be running, to prevent attracting passersby to the vehicle 104 and/or to prevent any of the vehicle sensors from false reading or false trigger. An example of one such vehicle component is the tilt and motion sensor. In this case, the processor 246 may adjust a tilt and motion threshold or trip points/thresholds associated with the tilt and motion sensor when the engine 242 may be running, to prevent false triggering of this sensor, as described above in conjunction with FIG. 1.

Another example of the vehicle component described above is the vehicle lights. In this case, the processor 246 may switch OFF the vehicle lights (via the BCM 220) responsive to switching ON the engine 242, to prevent the vehicle 104 from attracting passersby (or malicious users) to the vehicle 104 when the engine 242 may be running and to further save energy for battery charging. In some aspects, the processor 246 may switch OFF the vehicle lights, as described above, responsive to determining that the vehicle doors are locked (indicating that no one is expected to enter the vehicle 104 or the vehicle 104 is not expected to be used).

In further aspects, the processor 246 may ensure that the engine 242 is not switched ON during restrictive times of the day (which may be defined by the vehicle operator or the fleet manager), to prevent attracting passersby to the vehicle 104. For example, the processor 246 may not switch ON the engine 242 during nighttime to prevent attracting malicious users to the vehicle 104. In this case, the processor 246 may first obtain information associated with the restrictive times (which may be part of the information associated with user preferences fetched from the memory 248), and then correlate the information associated with the restrictive times with a current time. The processor 246 may switch ON the engine 242 to charge the battery 240 when the processor 246 determines that the current time is not equivalent to the restrictive time(s).

Figure 3:
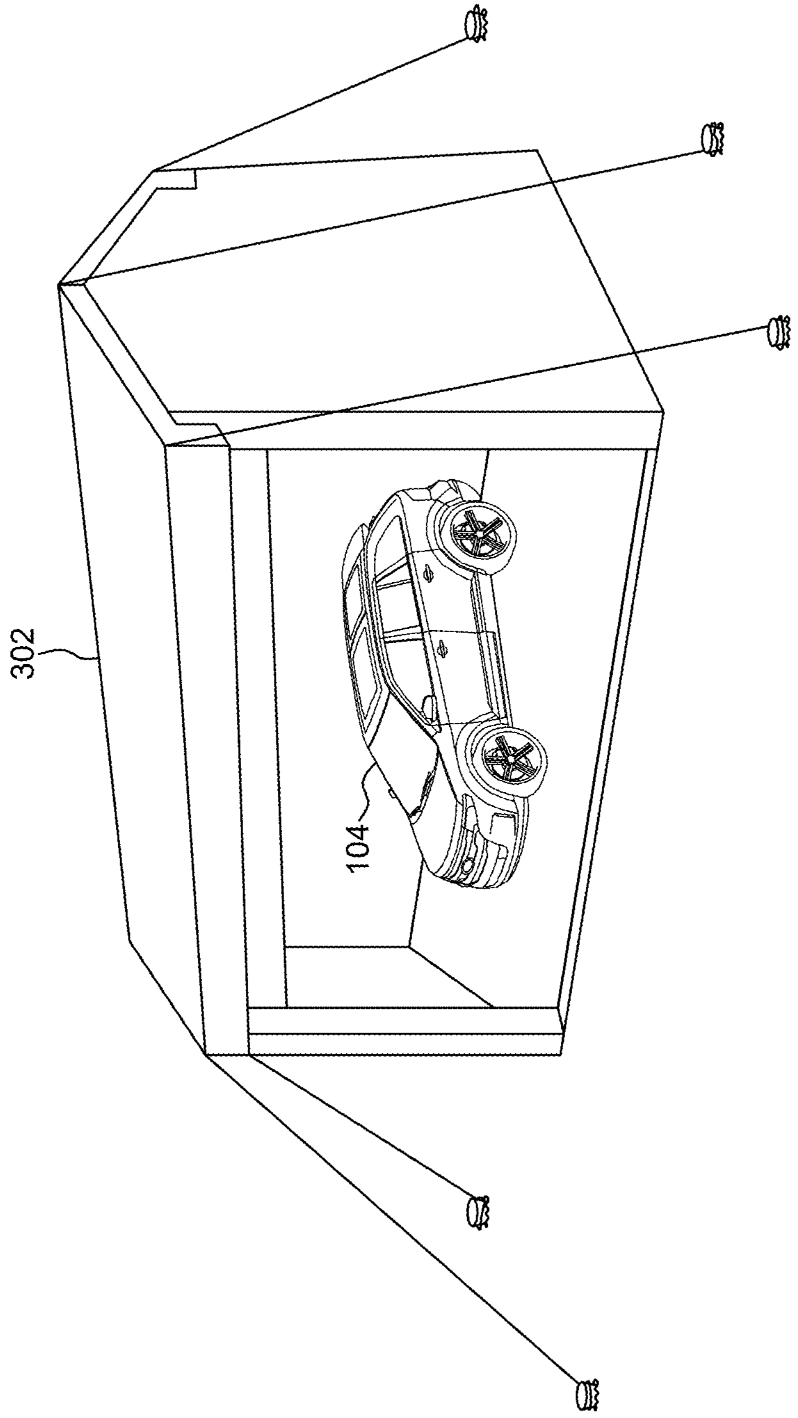
FIG. 3 depicts an example view of a temporary structure in which a vehicle is parked in accordance with the present disclosure.

The processor 246 may additionally not switch ON the engine 242 to charge the battery 240 when the processor 246 determines that the vehicle 104 may be located in a temporary structure 302 (or a predefined structure), as shown in FIG. 3. The temporary structure 302 may be a shade, a tent, etc., which may be present in the geographical area 102. As described above in conjunction with FIG. 1, by not switching ON the engine 242 in the temporary structure 302, the processor 246 may prevent occurrence of any adverse incident (which may occur due to the auto-start/remote-start of the engine 242 in the temporary structure 302 or due to emissions). In this case, the processor 246 may first determine that the vehicle 104 is parked in the temporary structure 302 in the geographical area 102 based on the inputs (e.g., the images) obtained from the vehicle sensory system 232. Responsive to determining that the vehicle 104 is parked in the temporary structure 302, the processor 246 may deactivate the vehicle battery management mode, so that the engine 242 is not switched ON to charge the battery 240 in the temporary structure 302. When the vehicle 104 moves out of the temporary structure 302, the processor 246 may activate the vehicle battery management mode again, so that the engine 242 may be switched ON for the predefined time duration to charge the battery 240, as described above.

In additional aspects, the processor 246 may not switch ON the engine 242 to charge the battery 240 when the processor 246 determines that the vehicle 104 may be located in a permanent structure (e.g., a garage, or a predefined structure), which typically has less ventilation. Similar to the scenario described above, by not switching ON the engine 242 in a permanent structure, the processor 246 may prevent occurrence of any adverse incident.

Furthermore, as described above in conjunction with FIG. 1, the processor 246 may switch OFF the engine 242 when the predefined time duration lapses to reduce the emissions. In some aspects, the processor 246 may switch OFF the engine 242 when the predefined time duration lapses to not only reduce the emissions, but also save fuel. It may be appreciated that if the engine 242 is kept in the ON state for a long time duration, considerable fuel consumption may occur, which may cause inconvenience to the user. To prevent occurrence of such a scenario, the processor 246 may switch OFF the engine 242 when the predefined time duration lapses to conserve fuel.

The processor 246 may again switch ON the engine 242 for the predefined time duration to charge the battery 240 after the predefined time interval. The predefined time interval may be user-defined, and may be, for example, 12 hours, 18 hours, 1 day, 3 days, and/or the like.

The processor 246 may again switch OFF the engine 242 when the predefined time duration lapses. The processor 246 may perform these steps of switching ON and switching OFF the engine 242 iteratively till the SoC reaches to predefined optimal SoC level. In some aspects, the predefined optimal SoC level may be user-defined (e.g., when the vehicle operator desires to pre-charge the battery 240 to a desired high SoC level before a scheduled trip). In other aspects, as described above in conjunction with FIG. 1, the processor 246 may itself set the predefined optimal SoC level based on the ambient temperature, the battery temperature, the battery health condition, and/or the like. In some aspects, the processor 246 may correlate the ambient/battery temperature with the battery health condition (e.g., by using a look-up table) to determine the predefined optimal SoC level. For example, if the ambient temperature is high and the battery 240 is new, the processor 246 may set a relatively lower predefined optimal SoC level. On the other hand, if the ambient temperature is high, but the battery 240 is old, the processor 246 may set a relatively higher predefined optimal SoC level (as the battery drain may be at a higher rate when the battery 240 is old). As another example, the processor 246 may set a relatively higher predefined optimal SoC level when the ambient temperature may be low, as the engine 242 may require more battery energy to crank when the operator desires to start the vehicle 104.

In further aspects, the processor 246 may ensure that the engine 242 is switched ON in a staggered manner relative to the engines associated with the vehicles 106, to reduce noise. In this case, the processor 246 may exchange (via the transceiver 244, and via the network 206 or V2V communication) information associated with vehicle engine start times and vehicle engine speeds (specifically rpm) of secondary vehicles (e.g., the vehicles 106) located in proximity to the vehicle 104. Responsive to obtaining the information described above from the vehicles 106, the processor 246 may determine an optimal time to switch ON the engine 242 to charge the battery 240 and an optimal vehicle engine speed for the engine 242 based on the obtained information. The processor 246 may determine the optimal time and the optimal vehicle engine speed such that the engine 242 and the engines associated with the vehicles 106 are switched ON in a staggered manner and at different engine speeds, to reduce noise.

Responsive to determining the optimal time as described above, the processor 246 may switch ON the engine 242 to charge the battery 240 at the optimal time. The processor 246 may further cause the engine 242 to operate at the optimal vehicle engine speed responsive to switching ON the engine 242.

The processor 246 may provide additional features to the operator/fleet manager or perform additional actions to efficiently charge the battery 240. For example, the processor 246 may monitor a fuel level in the vehicle 104 when the vehicle 104 may be parked at the geographical area 102. The processor 246 may cause the vehicle 104 to autonomously move to a predefined fuel filling station or pump located at or in proximity to the geographical area 102 to enable the vehicle 104 to get refueled, responsive to determining that the fuel level is below a predefined fuel level threshold. It may be appreciated that if the fuel level is low or close to being empty, the engine 242 may not operate and hence may not charge the battery 240. To prevent such a scenario from occurring, the processor 246 may cause the vehicle 104 to autonomously move to the predefined fuel filling pump to get refueled, when the fuel level drops below the predefined fuel level threshold.

In additional or alternative aspects, the processor 246 may transmit, via the transceiver 244, a refueling request to the fuel filling station when the fuel level drops below the predefined fuel level threshold. In this case, an operator at the fuel filling station may arrange to get the vehicle 104 refueled, responsive to receiving the refueling request from the processor 246/vehicle 104. In additional aspects, responsive to determining that the fuel level in the vehicle 104 may be below the predefined fuel threshold, the vehicle may transmit an alert notification to the user device 204 and/or the server 202, thereby notifying an operator or a fleet manager that the vehicle 104 may be running out of fuel.

In further aspects, the processor 246 may perform one or more additional actions to prevent any adverse situation, when the engine 242 may be charging the battery 240. For example, the processor 246 may automatically lock the vehicle doors when the processor 246 switches ON the engine 242 to charge the battery 240. The processor 246 may additionally switch OFF the engine 242 if the vehicle's steering wheel, doors, gas pedal, etc. are moved, or when someone enters the vehicle 104. In this case, the processor 246 may additionally take images of vehicle's interior and exterior portions (via the vehicle cameras), and transmit the images to the server 202. This may protect the vehicle 104 from any malicious user or activity.

The processor 246 may additionally transmit notifications/confirmation requests to the user device 204 when the processor 246 is about to switch ON the engine 242 to charge the battery 240. The processor 246 may switch ON the engine 242 when the vehicle operator approves/confirms the confirmation request, and may not switch ON the engine 242 when the vehicle operator declines the confirmation request. The processor 246 may additionally transmit an alert notification to the user device 204 when the fuel level may be low, indicating to the vehicle operator that the processor 246 may not be able to switch ON the engine 242 to charge the battery 240 till the vehicle 104 is refueled. In this case, the vehicle operator may arrange to get the vehicle 104 refueled.

Figure 4:
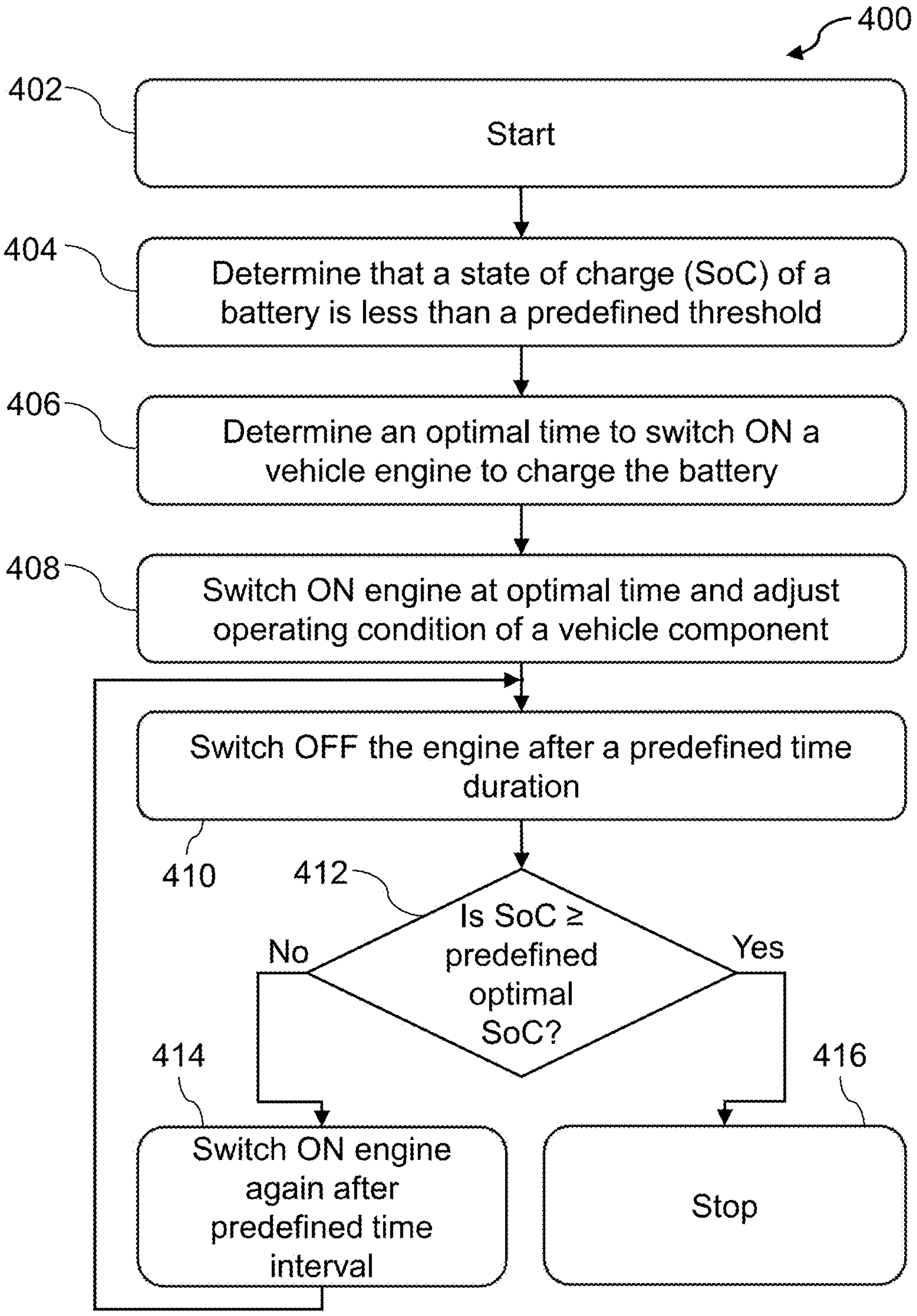
FIG. 4 depicts a flow diagram of an example method to auto-start or remote-start a vehicle engine in accordance with the present disclosure.

FIG. 4 depicts a flow diagram of an example method 400 to auto-start or remote-start the engine 242 in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include determining, by the processor 246, that the SoC of the battery 240 may be less than the predefined threshold. At step 406, the method 400 may include determining, by the processor 246, the optimal time to switch ON the engine 242 to charge the battery 240 responsive to determining that the SoC is less than the predefined threshold, as described above.

At step 408, the method 400 may include switching ON, by the processor 246, the engine 242 at the optimal time, and adjusting the operating condition of one or more vehicle components such as the vehicle lights, the tilt and motion sensor, and/or the like, as described above in conjunction with FIGS. 1 and 2. At step 410, the method 400 may include switching OFF, by the processor 246, the engine 242 after the predefined time duration.

At step 412, the method 400 may include checking, by the processor 246, whether the SoC is greater than or equivalent to the predefined optimal SoC level. The processor 246 may switch ON the engine 242 again after the predefined time interval at step 414, when the SoC is less than the predefined optimal SoC level. The method 400 may return to the step 410 after the step 414. On the other hand, the method 400 may move to step 416, when the SoC is greater than or equivalent to the predefined optimal SoC level. At the step 416, the method 400 stops.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a battery; and a processor configured to:

determine that a state of charge (SoC) associated with the battery is less than a predefined threshold;

switch ON a vehicle engine for a predefined time duration to charge the battery responsive to determining that the SoC is less than the predefined threshold;

adjust an operating condition of a vehicle component responsive to switching ON the vehicle engine, wherein the vehicle component is a vehicle light;

adjust the operating condition of the vehicle light by switching OFF the vehicle light;

determine that vehicle doors are locked responsive to switching ON the vehicle engine; and switch OFF the vehicle light responsive to determining that the vehicle doors are locked.

2. The vehicle of claim 1, wherein the vehicle component is a tilt and motion sensor, and wherein the processor adjusts the operating condition of the tilt and motion sensor by adjusting a tilt and motion threshold associated with the tilt and motion sensor.

3. The vehicle of claim 1, wherein the processor is further configured to:

determine that the vehicle is located at a predefined location;

activate a vehicle battery management mode responsive to determining that the vehicle is located at the predefined location; and switch ON the vehicle engine for the predefined time duration responsive to activating the vehicle battery management mode.

4. The vehicle of claim 3 further comprising a sensor unit configured to capture inputs associated with vehicle surroundings, wherein the processor is further configured to:

determine that the vehicle is parked in a predefined structure in the predefined location based on the inputs obtained from the sensor unit; and deactivate the vehicle battery management mode responsive to determining that the vehicle is parked in the predefined structure.

5. The vehicle of claim 1, wherein the processor is further configured to:

switch OFF the vehicle engine after the predefined time duration is lapsed; and switch ON the vehicle engine again after a predefined time interval to charge the battery again.

6. The vehicle of claim 5, wherein the processor is further configured to iteratively switch OFF and switch ON the vehicle engine until the SoC reaches to a predefined optimal SoC level.

7. The vehicle of claim 6, wherein the predefined optimal SoC level is based on at least one of: an ambient temperature, or a battery health condition.

8. The vehicle of claim 1, wherein the processor is further configured to:

determine an optimal time to switch ON the vehicle engine to charge the battery based on at least one of: an ambient temperature, a battery temperature, or a battery health condition, wherein the optimal time is a time when the battery is expected to accept charge at a high rate greater than a second predefined threshold; and switch ON the vehicle engine to charge the battery at the optimal time.

9. The vehicle of claim 1, wherein the processor is further configured to:

determine a user-preferred time to switch ON the vehicle engine to charge the battery based on user inputs; and switch ON the vehicle engine to charge the battery at the user-preferred time.

10. The vehicle of claim 1, wherein the processor is further configured to:

obtain an information associated with a restrictive time;

determine that a current time is not equivalent to the restrictive time; and switch ON the vehicle engine responsive to determining that the current time is not equivalent to the restrictive time.

11. The vehicle of claim 1, wherein the processor is further configured to:

obtain an information associated with a vehicle engine start time and a vehicle engine rpm (revolutions per minute) of a secondary vehicle located in proximity to the vehicle; and determine an optimal time to switch ON the vehicle engine and an optimal vehicle engine rpm for the vehicle engine based on the information;

switch ON the vehicle engine at the optimal time; and cause the vehicle engine to operate at the optimal vehicle engine rpm responsive to switching ON the vehicle engine.

12. The vehicle of claim 1, wherein the processor is further configured to:

determine that a fuel level in the vehicle is below a predefined fuel level threshold; and cause the vehicle to autonomously move to a predefined fuel filling station responsive to determining that the fuel level is less than the predefined fuel level threshold.

13. The vehicle of claim 1, wherein the processor is further configured to:

determine that a fuel level in the vehicle is below a predefined fuel level threshold; and transmit an alert notification to a user device responsive to determining that the fuel level is less than the predefined fuel level threshold.

14. The vehicle of claim 1, wherein the predefined time duration is based on at least one of a battery temperature or the SoC.

15. A vehicle comprising:

a battery; and a processor configured to:

determine that a state of charge (SoC) associated with the battery is less than a predefined threshold;

switch ON a vehicle engine for a predefined time duration to charge the battery responsive to determining that the SoC is less than the predefined threshold;

adjust an operating condition of a vehicle component responsive to switching ON the vehicle engine;

switch OFF the vehicle engine after the predefined time duration is lapsed;

switch ON the vehicle engine again after a predefined time interval to charge the battery again; and iteratively switch OFF and switch ON the vehicle engine until the SoC reaches to a predefined optimal SoC level.

16. The vehicle of claim 15, wherein the predefined optimal SoC level is based on at least one of: an ambient temperature, or a battery health condition.

17. A vehicle comprising:

a battery; and a processor configured to:

determine that a state of charge (SoC) associated with the battery is less than a predefined threshold;

switch ON a vehicle engine for a predefined time duration to charge the battery responsive to determining that the SoC is less than the predefined threshold;

adjust an operating condition of a vehicle component responsive to switching ON the vehicle engine;

determine an optimal time to switch ON the vehicle engine to charge the battery based on at least one of: an ambient temperature, a battery temperature, or a battery health condition, wherein the optimal time is a time when the battery is expected to accept charge at a high rate greater than a second predefined threshold; and switch ON the vehicle engine to charge the battery at the optimal time.

18. A vehicle comprising:

a battery; and a processor configured to:

determine that a state of charge (SoC) associated with the battery is less than a predefined threshold;

switch ON a vehicle engine for a predefined time duration to charge the battery responsive to determining that the SoC is less than the predefined threshold;

adjust an operating condition of a vehicle component responsive to switching ON the vehicle engine;

obtain an information associated with a restrictive time;

determine that a current time is not equivalent to the restrictive time; and switch ON the vehicle engine responsive to determining that the current time is not equivalent to the restrictive time.

19. A vehicle comprising:

a battery; and a processor configured to:

determine that a state of charge (SoC) associated with the battery is less than a predefined threshold;

switch ON a vehicle engine for a predefined time duration to charge the battery responsive to determining that the SoC is less than the predefined threshold;

adjust an operating condition of a vehicle component responsive to switching ON the vehicle engine;

obtain an information associated with a vehicle engine start time and a vehicle engine rpm (revolutions per minute) of a secondary vehicle located in proximity to the vehicle;

determine an optimal time to switch ON the vehicle engine and an optimal vehicle engine rpm for the vehicle engine based on the information;

switch ON the vehicle engine at the optimal time; and cause the vehicle engine to operate at the optimal vehicle engine rpm responsive to switching ON the vehicle engine.

* * * * *